Patented June 1, 1943

2,320,746

UNITED STATES PATENT OFFICE 2,320,746

ANTIOXIDANT

Philip T. Paul, Naugatuck, Conn., assignor to United States Rubber Company, New York, N. Y., a corporation of New Jersey No Drawing. Application April 30, 1941, Serial No. 391,144

10 Claims. (Cl. 260—810)

This invention relates to improvements in anti-oxidants.

An object of the invention is to provide chemicals for retarding the deterioration of rubber, natural or artificially prepared. A further object of the invention is to provide chemicals which additionally act as flex improvers or anti-flex cracking agents for vulcanized rubber such as tire treads, which undergo repeated strains during use. Further objects will be apparent from the following description.

According to the invention, the rubber composition has incorporated therein a product of reaction of a polyhydric phenol and an aliphatic diene. Exemplary of polyhydric phenols that may be reacted with the dienes are:

Hydroquinone
Resorcinol
Catechol
Pyrogallol
Phlorglucinol
Toluhydroquinone
2,5 dihydroxy biphenyl
1,4 dihydroxy naphthalene
2,5 dihydroxy ethyl benzene
Pyrogallol monomethyl ether
2,5 dihydroxy diphenyl ether
2,5 dihydroxy diphenyl sulfide
Dithiohydroquinone
Mono thio hydroquinone
2-allyl 1,4 dihydroxy benzene
2-methallyloxy, 1,4 dihydroxy benzene
2-dimethyl amino 1,4 dihydroxy benzene
2-methyl phenyl amino 1,4 dihydroxy benzene
2-chloro 1,4 dihydroxy benzene
4-phenyl catechol Examples of aliphatic dienes that may be reacted with any of the above polyhydric phenols for the purposes of the invention are:

Butadiene
Isoprene
2,3 dimethyl 1,3 butadiene
1,3 dimethyl 1,3 butadiene
1,1 dimethyl 1,3 butadiene
1,2 diethyl 1,3 butadiene
1,5 hexadiene
1,6 heptadiene
1,4 dimethyl 1,3 butadiene
1 phenyl 1,3 butadiene
2 phenyl 1,3 butadiene
2 para tolyl 1,3 butadiene
1 paraxenyl 1,3 butadiene
1,4 pentadiene
1 vinyl 1,3 butadiene
Cyclopentadiene
Cyclohexadiene The chemicals have special and outstanding properties in connection with the preservation of rubber and vulcanized rubber goods against the deterioration by oxygen, heat, or flexing. It has been found that the present reaction products preserve rubber with a minimum of discoloration due to light, and hence can be used for the preservation of white or light colored rubber goods. The reaction products are in general thick syrups having substantially no odor and can be readily incorporated in rubber. They are very soluble in rubber and may be used in large amounts with substantially no danger of blooming to the surface.

The constitution of the reaction products is unknown, but it is believed that they contain an appreciable amount of heterocyclic substances of chromane and/or coumarane structures. In the case of hydroquinone and butadiene the reaction may be—

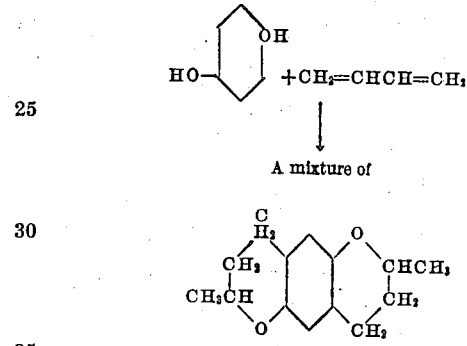

A mixture of

Benzo-p-di-2 methyl chromane

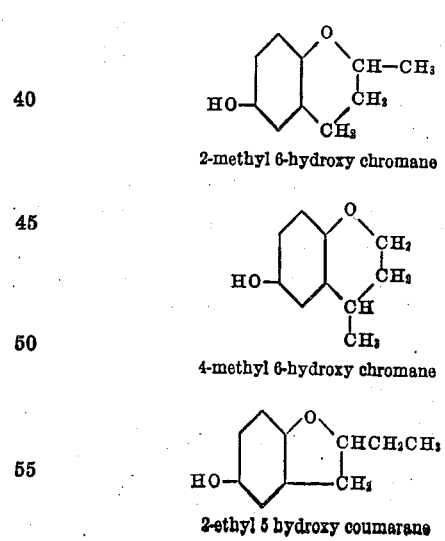

2-methyl 6-hydroxy chromane 4-methyl 6-hydroxy chromane 2-ethyl 5 hydroxy coumarane

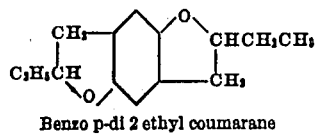

Benzo p-di 2 ethyl coumarane

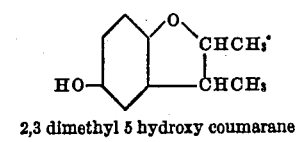

2,3 dimethyl 5 hydroxy coumarane

The reaction products of the invention are generally prepared by reacting the phenol and the diene at an elevated temperature, preferably in the range from about 100 to about 200° C., in the presence of suitable acidic catalysts. Either organic or inorganic solvents may be used such as acetic acid, alcohol, water, dioxane, acetone, methyl ethyl ketone, etc. As condensing agents, acidic substances such as the following may be used:

Iodine
Bromine
Chlorine
Hydriodic acid
Hydrobromic acid
Hydrochloric acid
Sulfuric acid
Oxalic acid
Calcium chloride
Aluminum chloride
Ferrous chloride
Hydrofluoric acid
Succinic acid
Chromic chloride
Manganese chloride
Acid activated
Bleaching earths The following examples are given to illustrate the preparation of the chemicals, and the effectiveness of their use in rubber. The parts are by weight:

*Example 1*

Hydroquinone (25 grams), 1,3 dimethyl 1,3 butadiene (38.6 cc.) are refluxed in 100 cc. acetic acid with 5 grams zinc chloride for 15 hours. After cooling benzene is added and the mixture extracted several times with water. The benzene solution is dried and the benzene removed by distillation. The residue from the distillation is a heavy syrup, boiling point 80–260° C. at 3 mm. mercury pressure.

*Example 2*

Catechol (25 grams) is reacted with 1,3 dimethyl 1,3 butadiene as in Example 1. The product distills 75–220° C. at 3 mm. mercury pressure.

*Example 3*

Resorcinol (25 grams) is reacted with 1,3 dimethyl 1,3 butadiene as in Example 1. The product distills 130–185° C. at 3 mm. mercury pressure.

*Example 4*

Pyrogallol (39 grams) is reacted with 1,3 dimethyl 1,3 butadiene as in Example 1. The product distills 135–200° C. at 2 mm. mercury pressure.

*Example 5*

Hydroquinone (22 grams) and 26.4 grams dicyclopentadiene are refluxed in 100 cc. acetic acid with 5 grams zinc chloride for 15 hours. The product is isolated as in Example 1. On vacuum fractionation two products are obtained.
I. Boiling range 100–300° C. at 3 mm.
II. Residue—a solid—melting range 135–155° C.

*Example 6*

A mixture of 33 grams hydroquinone, 21 grams isoprene, 33 cc. acetic acid and 3 grams zinc chloride is heated in a sealed tube over night at 130° C. The product is isolated as described in Example 1, except that it is not distilled.

*Example 7*

A mixture of 18.3 grams hydroquinone, 9 grams butadiene, 30 cc. acetic acid and 2 grams zinc chloride are heated in a sealed tube over night at 130° C. The product is worked up as described in Example 1. It is suitable as such for use in rubber without a distillation.

The materials are tested in a white molded stock of the composition:

*Master batch*

| | Parts |
|---|---|
| Pale crepe | 100 |
| Zinc oxide | 10 |
| Lithopone | 60 |
| Whiting | 60 |
| Zinc soap of cocoanut oil acids | 0.50 |
| Sulfur | 3.00 |
| Tetramethyl thiuram monosulfide | 0.15 |

The anti-oxidant to be tested is incorporated in the ratio of one (1.0) part to one hundred (100) parts of pale crepe. Cures are made for 10, 20, 30 minutes at 30 pounds per square inch steam.

The following data shows the tensile and elongation at break before and after ageing 96 hours in oxygen under 300 pounds per square inch pressure.

| Cure at 30 lbs./sq. in. steam pressure | Control | Hydroquinone—1,3 dimethyl 1,3 butadiene reaction product |
|---|---|---|
| *Unaged* | | |
| 10 mins | 2540–696 | 2680–720 |
| 20 mins | 2390–680 | 2410–690 |
| 30 mins | 2260–670 | 2270–686 |
| *Aged* | | |
| 10 mins | Failed | 2080–680 |
| 20 mins | Failed | 1640–653 |
| 30 mins | Failed | 1000–613 |

| | Control | Cathechol—1,3 dimethyl 1,3 butadiene reaction product |
|---|---|---|
| *Unaged* | | |
| 10 mins | 2510–690 | 2000–713 |
| 20 mins | 2130–680 | 2210–733 |
| 30 mins | 2120–683 | 2130–730 |
| *Aged* | | |
| 10 mins | Failed | 1640–710 |
| 20 mins | Failed | 1470–686 |
| 30 mins | Failed | 1220–686 |

| Cure at 30 lbs./sq. in. steam pressure | Control | Resorcinol—1,3 dimethyl 1,3 butadiene reaction product |
|---|---|---|
| | Unaged | |
| 10 mins | 2510-690 | 2290-700 |
| 20 mins | 2130-680 | 2260-700 |
| 30 mins | 2120-683 | 2130-703 |
| | Aged | |
| 10 mins | Failed | 1310-656 |
| 20 mins | Failed | 490-490 |
| 30 mins | Failed | 370-153 |
| | Control | Pyrogallol—1,3 dimethyl 1,3 butadiene reaction product |
| | Unaged | |
| 10 mins | 2510-690 | 2450-720 |
| 20 mins | 2130-680 | 2160-703 |
| 30 mins | 2120-683 | 2140-730 |
| | Aged | |
| 10 mins | Failed | 1610-663 |
| 20 mins | Failed | 1490-666 |
| 30 mins | Failed | 1230-650 |
| | Control | Hydroquinone—dicyclopentadiene volatile fraction |
| | Unaged | |
| 10 mins | 2760-743 | 2720-740 |
| 20 mins | 2540-720 | 2610-700 |
| 30 mins | 2420-703 | 2370-686 |
| | Aged | |
| 10 mins | 220-146 | 2000-660 |
| 20 mins | Failed | 1560-626 |
| 30 mins | Failed | 800-546 |
| | Control | Hydroquinone—dicyclopentadiene non-volatile fraction |
| | Unaged | |
| 10 mins | 2760-743 | 2610-706 |
| 20 mins | 2540-720 | 2600-703 |
| 30 mins | 2420-703 | 2370-703 |
| | Aged | |
| 10 mins | 220-146 | 1990-670 |
| 20 mins | Failed | 1300-603 |
| 30 mins | Failed | 580-470 |
| Cure at 30 lbs./sq. in. steam pressure | Control | Hydroquinone—isoprene reaction product |
| | Unaged | |
| 10 mins | 2620-686 | 2400-746 |
| 20 mins | 2360-693 | 2400-733 |
| 30 mins | 2060-693 | 2200-690 |
| | Aged | |
| 10 mins | 620-490 | 2080-650 |
| 20 mins | Failed | 1840-636 |
| 30 mins | Failed | 1380-596 |
| | Control | Hydroquinone—butadiene reaction product |
| | Unaged | |
| 10 mins | 2760-686 | 2740-700 |
| 20 mins | 2540-666 | 2540-683 |
| 30 mins | 2860-670 | 2260-660 |
| | Aged | |
| 10 mins | 800-606 | 1720-643 |
| 20 mins | Failed | 1760-643 |
| 30 mins | Failed | 1440-606 |

It is to be understood that the invention may be applied to the preservation of natural rubber compositions as well as artificially prepared rubber compositions, including reclaimed rubbers, and latices of such rubber compositions.

It is also to be understood that other desired filling and compounding ingredients may be incorporated along with the preservative, for example, there may be incorporated other accelerators, softeners, etc.

The anti-oxidant may be incorporated in any type of rubber composition such as those used for automobile tires and tubes, hose, belting, sheet and thread rubber, rubberized fabrics, molded goods, boots and shoes, etc. where vulcanized in a mold, in open steam, in hot air, or in the cold by the so-called acid process. The proportion of the anti-oxidant may vary from about 0.1% to 5%, although either smaller or greater proportions may be found useful. If the material to which it is added is a liquid such as rubber cement the anti-oxidant may be dissolved there in a suitable small proportion. The anti-oxidant may be incorporated into solid rubbers by milling or mastication and prepared for incorporation into dispersions or solutions either in powder, paste, or solution form, or applied in such forms for incorporation by diffusion to the surfaces of vulcanized or unvulcanized rubber goods.

Having thus described my invention, what I claim and desire to protect by Letters Patent is:

1. The method of preserving rubber compositions which comprises incorporating therein a product of acid-catalyzed reaction of a polyhydric phenol and an aliphatic diene hydrocarbon.

2. The method of preserving rubber compositions which comprises incorporating therein a product of acid-catalyzed reaction of a polyhydric phenol and a monomeric-1,3-butadiene hydrocarbon.

3. The method of preserving rubber compositions which comprises incorporating therein a product of acid-catalyzed reaction of a polyhydric phenol and 1,3 dimethyl 1,3 butadiene.

4. The method of preserving rubber compositions which comprises incorporating therein a product of acid-catalyzed reaction of a polyhydric phenol and 2, methyl 1,3 butadiene.

5. The method of preserving rubber compositions which comprises incorporating therein a product of acid-catalyzed reaction of a polyhydric phenol and a dicyclopentadiene.

6. The method of preserving rubber compositions which comprises incorporating therein a product of acid-catalyzed reaction of hydroquinone and an aliphatic diene hydrocarbon.

7. The method of preserving rubber compositions which comprises incorporating therein a product of acid-catalyzed reaction of hydroquinone and a monomeric 1,3-butadiene hydrocarbon.

8. The method of preserving rubber compositions which comprises incorporating therein a product of acid-catalyzed reaction of hydroquinone and a dicyclopentadiene.

9. A rubber composition containing a product of acid-catalyzed reaction of a polyhydric phenol and an aliphatic diene hydrocarbon.

10. A rubber composition containing a product of acid-catalyzed reaction of a polyhydric phenol and a monomeric 1,3-butadiene hydrocarbon.

PHILIP T. PAUL.